United States Patent [19]

Abdou-Sabet et al.

[11] 4,311,628
[45] Jan. 19, 1982

[54] THERMOPLASTIC ELASTOMERIC BLENDS OF OLEFIN RUBBER AND POLYOLEFIN RESIN

[75] Inventors: Sabet Abdou-Sabet, Akron; Michael A. Fath, Wadsworth, both of Ohio

[73] Assignee: Monsanto Company, St. Louis, Mo.

[21] Appl. No.: 87,123

[22] Filed: Oct. 22, 1979

Related U.S. Application Data

[63] Continuation-in-part of Ser. No. 973,769, Dec. 27, 1978, abandoned, which is a continuation-in-part of Ser. No. 849,773, Nov. 9, 1977, abandoned.

[51] Int. Cl.³ .................... C08L 23/26; C08L 23/04
[52] U.S. Cl. ..................... 260/33.6 AQ; 260/38; 260/42.33; 525/133; 525/141; 525/232
[58] Field of Search .............. 260/33.6 AQ, 42.33, 260/38; 525/133, 232

[56] References Cited

U.S. PATENT DOCUMENTS

| | | | |
|---|---|---|---|
| 3,037,954 | 6/1962 | Gessler et al. | 260/33.6 PQ |
| 3,287,440 | 11/1966 | Giller | 525/133 |
| 3,741,924 | 6/1973 | Okita et al. | 525/133 |
| 3,758,643 | 9/1973 | Fischer | 525/191 |
| 3,806,558 | 4/1974 | Fischer | 525/198 |
| 3,835,201 | 9/1974 | Fischer | 525/211 |
| 3,862,056 | 1/1975 | Hartman | 260/42.46 |
| 3,862,106 | 1/1975 | Fischer | 525/211 |
| 3,909,463 | 9/1975 | Hartman | 525/133 |
| 3,957,919 | 5/1976 | Bodungen et al. | 525/232 |
| 4,059,651 | 11/1977 | Smith | 525/155 |
| 4,130,535 | 12/1978 | Coran et al. | 525/232 |

*Primary Examiner*—Wilbert J. Briggs, Sr.
*Attorney, Agent, or Firm*—Larry R. Swaney

[57] ABSTRACT

Thermoplastic elastomeric compositions, comprising blends of olefin rubber and polyolefin resin in which the rubber is cured with phenolic curative, exhibit superior properties including improved compression set and oil resistance.

60 Claims, No Drawings

THERMOPLASTIC ELASTOMERIC BLENDS OF OLEFIN RUBBER AND POLYOLEFIN RESIN

This application is a continuation-in-part application of application Ser. No. 973,769, filed Dec. 27, 1978 now abandoned, which is a continuation-in-part application of application Ser. No. 849,773, filed Nov. 9, 1977 now abandoned. This application relates to thermoplastic elastomeric compositions comprising blends of polyolefin resin and cured olefin rubber.

BACKGROUND OF THE INVENTION

It is known that curing EPDM rubber with phenolic curative gives good mechanical properties but, as predicted by Hoffman, infra, the curing of EPDM rubber with phenolic curative has not been accepted commercially.

Thermoplastic elastomeric (elastoplastic) compositions consisting of blends of polyolefin resin and cured EPDM rubber exhibiting superior physical properties including improved tensile strength, are known. Belgium Pat. No. 844,318 issued Jan. 20, 1977, and U.S. Pat. No. 4,130,535 issued Dec. 19, 1978. The aforesaid improved compositions are economically attractive because they may be extended with extender oil and carbon black which additives improve properties including processability and oil resistance while lowering the cost. However, compositions exhibiting better oil resistance are needed to meet high performance specifications where exposure to organic solvents or oil at high temperature is encountered. Surprisingly, blends of polyolefin resin and EPDM rubber cured with phenolic curative exhibit superior properties including superior oil resistance as compared with blend compositions which are identical except for the EPDM rubber being cured with other curatives.

SUMMARY OF THE INVENTION

In accordance to this invention, it has been found that elastoplastic compositions comprising polyolefin resin and EPDM rubber in which the rubber is cured with phenolic curative are tough, strong, elastomeric compositions processable as thermoplastics and have improved properties as compared to blends of similar composition but in which the rubber is cured with sulfur or peroxide curatives. Compositions of the invention exhibit improved oil resistance and compression set and articles made thereof have smoother surfaces free of bloom (surface haze). The use of phenolic curative reduces objectionable odor during manufacture and processing and gives more pleasantly scented products. Compositions of the invention are more easily processed especially in extrusion processes and also exhibit improved paintability, i.e., the surfaces provide better adherance for the paint. These and other advantages will become apparent as the description of the invention proceeds.

Elastoplastic compositions of the invention are compositions comprising blends of (a) thermoplastic crystalline polyolefin resin, in an amount sufficient to impart thermoplasticity to the composition, and (b) cured EPDM rubber, in an amount sufficient to impart rubberlike elasticity to the composition, in which the rubber is cured with phenolic curative comprising phenolic curing resin and cure activator. The relative proportions of polyolefin resin and EPDM rubber are not subject to absolute delineation because the limits vary due to a number of factors including type, molecular weight, or molecular weight distribution of the polyolefin resin or EPDM rubber and are dependent upon the absence or presence of other ingredients in the composition. For example, inert fillers such as carbon black or silica tend to reduce the operative range, whereas, extender oil and plasticizers tend to increase the range of operative proportions. Generally, the compositions comprise blends of about 15–75 parts by weight of thermoplastic crystalline polyolefin resin and about 85–25 parts by weight of EPDM rubber per 100 total parts by weight of polyolefin resin and rubber. Preferred compositions comprise blends of about 25–75 parts by weight of thermoplastic crystalline polyolefin resin and about 75–25 parts by weight of EPDM rubber per 100 total parts by weight of polyolefin resin and rubber. More preferred compositions contain polyolefin resin in amounts not exceeding 50 weight percent of the total composition.

The EPDM rubber is fully cured in the compositions of the invention. A convenient procedure for evaluating the state of cure consists of determining the amount of rubber soluble in cyclohexane. The rubber is regarded as fully cured when it is cured to the extent that no more than about three percent of the rubber is extractable in cyclohexane at 23° C. The procedure which takes into account the presence of soluble ingredients other than rubber will be described in greater detail later. An alternative means for evaluating the state of cure consists of determining the amount of rubber soluble in boiling xylene. The rubber is regarded as fully cured when it is cured to the extent that no more than about five percent of the rubber in the blend is extractable in boiling xylene, preferably, no more than about three percent, more preferably, no more than about one percent of the rubber is extractable in boiling xylene. It should be appreciated that the compositions of the invention consist essentially of blends of polyolefin resin and cured EPDM rubber and contain negligible amounts, if any, of grafted copolymer of polyolefin resin and EPDM rubber. Accordingly, the compositions of the invention should not be confused with the graft copolymers described in Hartman, U.S. Pat. Nos. 3,862,056 and 3,909,463. The absence of graft copolymer is confirmed in the compositions of the invention because the cured EPDM rubber is essentially insoluble in boiling xylene and thereby can be separated from the polyolefin resin in the blend, whereas, the Hartman graft copolymers are essentially completely soluble in boiling xylene. In the preferred compositions of the invention, essentially all of the polyolefin resin is soluble but no more than about three percent of the rubber is extractable in boiling xylene. Infrared analysis of the isolated polyolefin resin fraction (soluble in boiling xylene but insoluble in xylene at room temperature) show it to be essentially free of grafted EPDM rubber with less than about two weight percent of grafted EPDM rubber being present.

Vulcanizable rubbers, although thermoplastic in the uncured state, are normally classified as thermosets because they undergo the irreversible process of thermosetting to an unprocessable state. The products of the instant invention, although processable, contain irreversibly thermoset rubber (although of quite small particle size) because they can be prepared from blends of rubber and polyolefin resin which are treated with phenolic curatives in amounts and under time and temperature conditions known to give fully cured products and, indeed, the rubber has undergone gelation (because insoluble in organic solvents) to the extent characteristic of such a state of cure. The thermoset state of the bulk composition can be avoided in the compositions of the invention by simultaneously masticating and curing the blends. Thus, the thermoplastic elastomeric (elastoplastic) compositions of the invention may be prepared by blending a mixture of EPDM rubber, softened or molten polyolefin resin, and phenolic curatives, then masticating the blend at a temperature which maintains the melt and promotes curing until cure is complete, using conventional masticating equipment, for example, Banbury mixers, Brabender mixers, or certain mixing extruders.

The ingredients except curative are mixed at a temperature sufficient to soften the polyolefin resin or, more commonly, at a temperature above its melting point if the resin is crystalline at ordinary temperatures. After the molten resin and EPDM rubber are intimately mixed, phenolic curative (i.e., phenolic curing agent and cure activator) is added. Heating and masticating at curing temperatures are generally adequate to complete the cross-linking reaction in a few minutes or less The time required to complete the cross-linking reaction varies depending upon the cure temperature and the type of EPDM rubber or phenolic curative system employed. A suitable range of curing temperatures is from about the melting temperature of the polyolefin resin (about 120° C. in the case of polyethylene and about 175° C. in the case of polypropylene) to 250° C. or more; typically, the range is from about 150° C. to 225° C. A preferred range of curing temperatures is from about 170° C. to about 200° C. To obtain thermoplastic compositions, it is important that mixing continues without interruption until curing occurs. If appreciable curing is allowed after mixing has stopped, a thermoset unprocessable composition may be obtained.

The particular results obtained by the aforedescribed dynamic curing process are a function of the particular rubber curing system selected. It has now been found that phenolic curative systems give improved compositions heretofore not obtained. It is essential to select a phenolic curative system which fully cures the rubber which result generally requires using a cure activator along with a phenolic curing resin. Similarly, the process using phenolic curative systems is only applicable to polyolefin terpolymer rubber comprising two monoolefins and at least one diolefin, such as, ethylene, propylene and nonconjugated diene containing residual unsaturation in the side chains commonly referred to as "EPDM rubbers". EPDM rubbers essentially free of unsaturation are unsatisfactory, not being sufficiently cross-linkable by phenolic curative systems. Moreover, the presence of at least about 15% by weight of polyolefin resin in the blend is required for the consistent preparation of processable thermoplastic elastomers. It is thus possible to obtain unprocessable dynamically cured compositions even before complete gelation has occurred or to obtain only minor improvements in tensile strength by curing. But it is assumed that no one would want to achieve a useful result, and would not be misled by the fact that the interaction of the variables which influence the result is imperfectly understood. A few simple experiments within the skill of the art utilizing available rubbers and phenolic curative systems will suffice to determine their applicability for the preparation of the improved products of this invention.

The new products are all processable in an internal mixer, to products which, upon transferring at temperatures above the softening or crystallizing points of the resin phases to the rotating rolls of a rubber mill, form continuous sheets. The sheets are reprocessable in the internal mixer in which, upon reaching temperatures above the softening or melting points of the polyolefin resin phase, are again transformed to the plastic state (molten state of the resin phase) but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, elastoplastic compositions of the invention are further processable to the extent that articles may be formed therefrom by extrusion, injection molding, blow molding, thermoforming, etc.

The amount of curable rubber extractable from a blend is used to measure the extent of cure. The improved elastoplastic compositions of the invention are produced by curing the blends to the extent that the cured composition contains no more than about three percent by weight of curable rubber extractable in cyclohexane at 23° C. or no more than about five percent by weight of curable rubber extractable in boiling xylene. In general, the less extractables the better are the properties and still more preferable are compositions having essentially no extractable rubber (less than 1.0 weight percent) in the organic solvent. The percent of soluble rubber in the cured composition is determined by soaking a nominally 2 mm thick specimen for 48 hours in cyclohexane at 23° C. or refluxing a thin film specimen in boiling xylene for one half hour, weighing the dried residue and making suitable corrections for soluble and insoluble components based upon knowledge of the composition. Soluble components, other than the curable rubber, are, for example, extender oils, plasticizers, low molecular weight polymers and components of the polyolefin resin soluble in the solvent. Insoluble components are, for example, pigments, fillers, and zinc oxide. Any materials in the uncured rubber which are soluble in acetone or any ethylene-propylene copolymer containing no unsaturation (no termonomer) are regarded as being non-crosslinkable components of the rubber which quantities are subtracted from the rubber when calculating the percent of soluble rubber in a cured composition. Up to five weight percent, typically between 0.5–2.0 weight percent, of EPDM rubber is acetone soluble.

Of course, it is understood that enough of phenolic curative must be used to fully cure the rubber. The minimum quantities of phenolic curative necessary to cure the rubber varies depending upon the type of rubber, phenolic curing agent, type cure promoter and curing conditions such as temperature. Typically, the quantity of phenolic curing agent used to fully cure the EPDM rubber is about 5 parts to 20 parts by weight phenolic curing agent per 100 parts by weight of EPDM rubber. Preferably, the quantity of phenolic curing agent is between about 7 parts to 14 parts by weight phenolic curing agent per 100 parts by weight EPDM rubber. In addition, an appropriate quantity of cure activator is used to assure full cure of the rubber. Satisfactory amounts of cure activator varies from 0.01 parts by weight to ten parts by weight per 100 parts by weight EPDM rubber, although, higher amounts may be used, if desired and satisfactory cure is obtained. The term "phenolic curative" includes phenolic curing agent (resin) and cure activator. However, it should not be assumed, from the fact that the amount of phenolic curative is based on the EPDM rubber content of the blend that the phenolic curative does not react with the polyolefin resin or that there is no reaction between the polyolefin resin and EPDM rubber. There may be highly significant reactions involved but of limited extent, i.e., there is no substantial quantity of graft formation between the polyolefin resin and the EPDM rubber. Essentially all of the cured EPDM rubber and polyolefin resin can be separated and isolated from the blend by high temperature solvent extraction, for example, boiling xylene extraction and infrared analysis of the isolated fractions indicated that little, if any, graft copolymer is formed between the EPDM rubber and polyolefin resin.

Any EPDM rubber which can be completely cured (cross-linked) with phenolic curative is satisfactory in the practice of the invention. Suitable monoolefin terpolymer rubber comprises essentially non-crystalline, rubbery terpolymer of two or more alpha monoolefins, preferably copolymerized with at least one polyene, usually a non-conjugated diene which rubber herein and in the claims is referred to as "EPDM rubber." Satisfactory EPDM rubbers comprise the products from the polymerization of monomers comprising two monoolefins, generally ethylene and propylene, and a lesser quantity of non-conjugated diene. The amount of non-conjugated diene is usually between 2-10 weight percent of the rubber. Any EPDM rubber which has sufficient reactivity with phenolic curative to completely cure is suitable in the practice of the invention. The reactivity of EPDM rubber varies depending upon both the amount of unsaturation and the type of unsaturation present in the polymer. For example, EPDM rubbers derived from ethylidene norbornene are more reactive toward phenolic curatives than EPDM rubbers derived from dicyclopentadiene and EPDM rubbers derived from 1,4-hexadiene are less reactive toward phenolic curatives than EPDM rubbers derived from dicyclopentadiene. However, the differences in reactivity can be overcome by polymerizing larger quantities of less active diene into the rubber molecule. For example, 2.5 weight percent of ethylidene norbornene or dicyclopentadiene may be sufficient to impart sufficient reactivity to the EPDM to make it completely curable with phenolic curative comprising conventional cure activators, whereas, at least 3.0 weight percent or more is required to obtain sufficient reactivity in an EPDM rubber derived from 1,4-hexadiene.

Suitable alpha monoolefins are illustrated by the formula $CH_2=CHR$ in which R is hydrogen or alkyl of 1-12 carbon atoms, examples of which include ethylene, propylene, 1-butene, 1-pentene, 1-hexene, 2-methyl-1-propene, 3-methyl-1-pentene, 4-methyl-1-pentene, 3,3-dimethyl-1-butene, 2,4,4-trimethyl-1-pentene, 3-methyl-1-hexene, 1,4-ethyl-1-hexene and others. Satisfactory non-conjugated dienes include straight chain (acyclic) dienes such as 1,4-hexadiene, 2-methyl-1,4-pentadiene, 1,4,9 decatriene and 11-ethyl-1, 11-tridecadiene; monocyclic dienes such as 1,5-cyclooctadiene, 1,4-cycloheptadiene and 1-methyl-1,5-cyclooctadiene and bridged ring bicyclic dienes such as 5-ethylidenenorbornene, 5-methylene-2-norbornene; 5-isopropylidene-2-norbornene and 2-methyl-bicyclo-(2,2,1)-2,5-heptadiene; fused ring bicyclics such as bicyclo (4.3.0)-3-7-nonadiene; 5-methyl-bicyclo(4.3.0)-3,7-nonadiene; 5,6-dimethyl-bicyclo-(4.3.0)-3,7-nonadiene and bicyclo(3.2.0)-2,6-heptadiene; alkenyl substituted monocyclics such as 4-vinyl-cyclohexene; 1,2-divinylcyclobutane and 1,2,4-trivinylcyclohexane; and tricyclics such as dicyclopentadiene. Grades of EPDM rubbers suitable for the practice of the invention are commercially available. Rubber World Blue Book 1975 Edition, Materials and Compounding Ingredients for Rubber, pages 406–410.

Suitable thermoplastic polyolefin resins comprise crystalline, high molecular weight solid products from the polymerization of one or more monoolefins by either high pressure or low pressure processes. Examples of such resins are the isotatic and syndiotactic monoolefin polymer resins, representative members of which are commercially available. Examples of satisfactory olefins are ethylene, propylene, 1-butene, 1-pentene, 1-hexene, 2-methyl-1-propene, 3-methyl-1-pentene, 4-methyl-1-pentene, 5-methyl-1-hexene and mixtures thereof. Commercially available thermoplastic polyolefin resins, and preferably polyethylene or polypropylene, may be advantageously used in the practice of the invention, with polypropylene being preferred.

Any phenolic curative system which fully cures EPDM rubber is suitable in the practice of the invention. A basic ingredient of such system is a phenolic curing resin made by condensation of halogen substituted phenol, $C_1-C_{10}$ alkyl substituted phenol or unsubstituted phenol with an aldehyde, preferably, formaldehyde, in an alkaline medium or by condensation of bifunctional phenoldialcohols. Dimethylol phenols substituted in the para-position with $C_5-C_{10}$ alkyl groups are preferred. Halogenated alkyl substituted phenol curing resins prepared by halogenation of alkyl substituted phenol curing resin are also especially suitable. Phenolic curative systems comprising methylol phenolic resins, halogen donor and metal compound are especially recommended, details of which are described in Giller, U.S. Pat. No. 3,287,440 and Gerstin et al, U.S. Pat. No. 3,709,840. Non-halogenated phenol curing resins are used in conjunction with halogen donors, preferably, along with a hydrogen halide scavenger. Ordinarily, halogenated, preferably brominated, phenolic resins containing 2–10 weight percent bromine, do not require halogen donor but are used in conjunction with a hydrogen halide scavenger such as metal oxides such as iron oxide, titanium oxide, magnesium oxide, magnesium silicate, silicon dioxide and preferably zinc oxide, the presence of which promotes the cross-linking function of the phenolic resin, however, with rubbers which do not readily cure with phenolic resins, the conjoint use of a halogen donor and zinc oxide is recommended. The preparation of halogenated phenol resins and their use in a curative system with zinc oxide are described in U.S. Pat. Nos. 2,972,600 and 3,093,613, the disclosure of which along with the disclosure of the aforesaid Giller and Gerstin patents are incorporated herein by reference. Examples of suitable halogen donors are stannous chloride, ferric chloride, or halogen donating polymers such as chlorinated paraffin, chlorinated polyethylene, chlorosulfonated polyethylene, and polychlorobutadiene (neoprene rubber). The term "activator" as used herein means any material which materially increases the cross-linking efficiency of the phenolic curing resin and includes metal oxides and halogen donors either used alone or conjointly. For further details of phenolic curative systems see "Vulcanization and Vulcanizing Agents," W. Hoffman, Palmerton Publishing Company. Suitable phenolic curing resins and brominated phenolic curing resins are commercially available, for example, such resins may be purchased under the trade names SP-1045, CRJ-352, SP-1055 and SP-1056 from Schenectady Chemicals, Inc. Similar functionally equivalent phenolic curing resins may be obtained from other suppliers. As explained above, sufficient quantities of curatives are used to achieve essentially complete cure of the rubber.

The properties of the elastoplastic compositions of this invention may be modified, either before or after vulcanization, by addition of ingredients which are conventional in the compounding of EPDM rubber, polyolefin resin and blends thereof. Examples of such ingredients include particulate filler such as carbon black, silica, titanium dioxide, colored pigments, clay, zinc oxide and stearic acid, stabilizers, antidegradants, flame retardants, processing aids, adhesives, tackifiers, plasticizers, wax, discontinuous fibers, such as wood cellulose fibers and extender oils. The addition of carbon black, extender oil or both, preferably prior to dynamic curing, are particularly recommended. Carbon black improves the tensile strength and tends to promote the phenolic curative. Extender oil can improve the resistance to oil swell, heat stability, hysteresis, cost and permanent set of the elastoplastic composition. Aromatic, naphthenic and paraffinic extender oils are satisfactory. The addition of extender oil can also improve processability. For suitable extender oils, refer to Rubber World Blue Book, supra, pages 145–190. The quantity of extender oil added depends upon the properties desired, with the upper limit depending upon the compatibility of the particular oil and blend ingredients which limit is exceeded when excessive exuding of extender oil occurs. Typically, 5–300 parts by weight extender oil are added per 100 parts by weight blend of olefin rubber and polyolefin resin. Commonly about 30 to 250 parts by weight of extender oil are added per 100 parts by weight of rubber present in the blend with quantities of about 70 to 200 parts by weight of extender oil per 100 parts by weight of rubber being preferred. The amount of extender oil depends, at least in part, upon the type of rubber. High viscosity rubbers are more highly oil extendable. Colorable compositions of the invention are prepared by incorporation of non-black fillers instead of carbon black. Colorless, off-white or white pigments (fillers, extenders, or reinforcing pigments) such as silica, aluminum silicate, magensium silicate, kaolin clay and titanium dioxide are suitable for such purposes. Preferably, a coupling agent such as titanates or silanes are used with non-black fillers especially with kaolin clay. Typically, 5–100 parts by weight non-black pigment are added per 100 parts by weight of rubber in the blend. Typical additions of fillers either carbon black or non-black fillers comprise about 40–250 parts by weight of carbon black per 100 parts by weight of EPDM rubber and usually about 10–100 parts by weight filler per 100 parts total weight of EPDM rubber and extender oil. The amount of filler which can be used depends, at least in part, upon the type of filler and the amount of extender oil to be used.

Methods other than the dynamic curing of rubber/polyolefin resin blends can be utilized to prepare compositions of the invention. For example, the rubber can be fully cured in the absence of the polyolefin resin, either dynamically or statically, powdered, and mixed with the polyolefin resin at a temperature above the melting or softening point of the resin. Provided that the cross-linked rubber particles are small, well dispersed and in an appropriate concentration, the compositions within the invention are easily obtained by blending cross-linked rubber and polyolefin resin. Accordingly, the term "blend" herein means a mixture comprising well dispersed small particles of cross-linked rubber. A mixture which is outside of the invention because it contains poor dispersed or too large rubber particles can be comminuted by cold milling (to reduce particle size to below about $50\mu$) preferably below $20\mu$ and more preferably to below $5\mu$. After sufficient comminution or pulverization, a composition of the invention is obtained. Frequently, poor dispersion or too large rubber particles is obvious to the naked eye and observable in a molded sheet. This is especially true in the absence of pigments and fillers. In such a case, pulverization and remolding gives a sheet in which aggregates of rubber particles or large particles are not obvious or are far less obvious to the naked eye and mechanical properties are greatly improved.

Elastoplastic compositions of the invention are useful for making a variety of articles such as tires, hoses, belts, gaskets, moldings and molded parts. They are particularly useful for making articles by extrusion, injection molding and compression molding techniques. They also are useful for modifying thermoplastic resins, in particular, polyolefin resins. The compositions are blended with thermoplastic resins using conventional mixing equipment. The properties of the modified resin depend upon the amount of elastoplastic composition blended. Generally, the amount of elastoplastic composition is such that the modified resin contains about 5 to 25 parts by weight of EPDM rubber per about 95 to 75 parts total weight of resin.

The stress-strain properties of the compositions are determined in accordance with the test procedures set forth in ASTM D638 and ASTMD1566. The term "elastomeric" as used herein and in the claims means a composition which possesses the tension set property of forcibly retracting within a given period of time (1 or 10 minutes) to less than 160% of its original length after being stretched at room temperature to twice its original length and held for the same period of time (1 or 10 minutes) before release. Compression set is determined in accordance with ASTM D-395, Method B, by compressing the sample for 22 hours at 100° C. Oil swell (percent change in weight) is determined in accordance with the ASTM D-471 by submerging the specimen in ASTM #3 oil for 3 days at 121° C. Especially preferred compositions of the invention are rubbery compositions having tension set values of about 50% or less which compositions meet the definition for rubber as defined by ASTM Standards, V. 28, page 756 (D1566). More preferred compositions are rubbery compositions having a Shore D hardness of 60 or below or a 100% modulus of 180 Kg./cm$^2$ or less or a Young's modulus below 2500 Kg/cm$^2$.

DESCRIPTION OF PREFERRED EMBODIMENTS

To illustrate the invention, a masterbatch containing EPDM rubber, paraffinic extender oil, carbon black, zinc oxide, stearic acid and antidegradant (when present) in the indicated proportions (all parts by weight) is mixed with polypropylene at 80 rpm in a Brabender mixer with an oil bath temperature of 180° C. for 2.5 minutes after which time the polypropylene is melted and a uniform blend is obtained. Hereinafter temperature of a Brabender mixer will be understood to be temperature of the oil bath. Phenolic curative is added and mixing is continued for four additional minutes at which time maximum Brabender consistency has been reached. The composition is removed and specimens are compression molded at 210° C. The specimens are cooled below 100° C. under pressure before removal. Properties of the molded sheet are measured and recorded.

Data for various compositions are shown in Table I. Stocks 1–3 and 4–6 contain different EPDM rubbers as identified in the footnotes. Stocks 1 and 4 are controls containing no curatives. Stocks 2 and 5 illustrate compositions of the invention cured with phenolic curative. Stocks 3 and 6 included for comparison are compositions cured with sulfur curative system. The EPDM rubber in Stocks 2, 3, 5 and 6 is fully cured, i.e., compositions are characterized by less than 3% by weight of the rubber (based on total weight of rubber present) being extractable in cyclohexane at room temperature or in boiling xylene. The cured compositions are elastomeric and processable as thermoplastics and may be reprocessed without the need for any reclaiming in contrast to static cured compositions which are thermosets not processable as thermoplastics. The data show that compositions prepared from EPDM containing a high ethylene content have higher hardness. The data further show that the compositions prepared with phenolic curing resin have substantially the same stress-strain properties, whereas, the sulfur cure system is more efficient in the composition containing low polydispersity EPDM rubber. The compositions cured with phenolic curing resin exhibit two important advantages compared to compositions cured with sulfur curative, namely, greater oil resistance (low oil swell) and better compression set.

Compositions comprising blends containing EPDM rubber as the major component are shown in Table II. Stock 1 contains no curatives. Stock 2 illustrates a composition of the invention cured with phenolic curing ring. Stocks 3 and 4 included for comparison are compositions cured with sulfur curative system and peroxide curative, respectively. The polypropylene is the same as in Table I. The EPDM rubber is a terpolymer comprising 69 wt.% ethylene, 8.3 wt.% ethylidene norbornene, and the balance propylene, polydispersity 2.2, Mooney Visc. 51(ML8@100° C.). The procedure is the same as in Table I, except in Stock 2, the zinc oxide is added one minute after adding the phenolic curing resin and in Stock 4, 0.6 parts by weight of tris (nonylphenyl)phosphite, a free radical scavenger, is charged after the maximum Brabender consistency has been reached. The data indicate that the composition cured with phenolic curing resin exhibits greater oil resistance (low oil swell) and better compression set.

Soft compositions containing high proportions of rubber and extender oil are shown in Table III. The procedure is the same as in Table I except after the curatives are added mixing is continued for five minutes. Stock 1 is a control containing no curatives. Stocks 2, 4 and 6 illustrate compositions of the invention cured with phenolic curing resin. Stocks 3, 5 and 7 are compositions cured with sulfur curative system. The data indicate that the compositions cured with phenolic curing resin have better compression set and improved oil resistance. In addition, the compositions cured with phenolic curing resin give smoother surfaces upon extrusion or injection molding. Surfaces of extrudates and parts molded from compositions cured with phenolic curing resin are bloom-free and non-sticky. Stock 6 containing a high proportion of rubber exhibits superior elastomeric properties such as low tension set and low compression set.

TABLE I

| Stocks | 1 | 2 | 3 | 4 | 5 | 6 |
|---|---|---|---|---|---|---|
| EPDM rubber | 36[1] | 36[1] | 36[1] | 36[2] | 36[2] | 36[2] |
| Polypropylene[3] | 64 | 64 | 64 | 64 | 64 | 64 |
| Extender Oil | 30.6 | 30.6 | 30.6 | 30.6 | 30.6 | 30.6 |
| Carbon Black | 28.8 | 28.8 | 28.8 | 28.8 | 28.8 | 28.8 |
| Zinc Oxide | 1.8 | 1.8 | 1.8 | 1.8 | 1.8 | 1.8 |
| Stearic Acid | 0.36 | 0.36 | 0.36 | 0.36 | 0.36 | 0.36 |
| Flectol-H Antidegradant[4] | 0.72 | 0.72 | 0.72 | — | — | — |
| SP-1056[5] | — | 3.24 | — | — | 3.24 | — |
| Sulfur Curative[6] | — | — | 1.31 | — | — | 1.31 |
| Hardness, Shore D | 43 | 47 | 47 | 35 | 40 | 39 |
| 100% Modulus, Kg./cm$^2$ | 86 | 115 | 101 | 70 | 114 | 87 |
| UTS, Kg./cm$^2$ | 110 | 176 | 190 | 78 | 179 | 139 |
| Ult. Elong., % | 460 | 390 | 490 | 460 | 300 | 390 |
| #3 ASTM Oil Swell, % | 131 | 67 | 88 | 88 | 53 | 75 |
| Compression Set, % | — | — | — | 68 | 36 | 52 |

[1]73 wt. % ethylene, 4.4 wt. % ethylidene norbornene, polydispersity 2.1, SP. gr. 0.86, Mooney Visc., 55 (ML + 121° C.).
[2]55 wt. % ethylene, 4.4% ethylidene norbornene, polydispersity 5.2, SP. gr. 0.86, Mooney Visc., 40 (ML 1 + 8 @ 121 ° C.).
[3]Low flow, general purpose, SP. g. 0.902, 11% yield elongation.
[4]Polymerized 1,2-dihydro-2,2,4-trimethylquinoline.
[5]Brominated methylol phenolic curing resin.
[6]Sulfur 17.2 parts, zinc dimethyldithiocarbamate 10.3 parts, tetraethyl thiuram disulfide 10.3 parts, 2-bis(benzothiazolyl) disulfide 34.5 parts and dipentamethylene thiuram hexasulfide 27.7 parts.

TABLE II

| Stocks | 1 | 2 | 3 | 4 |
|---|---|---|---|---|
| EPDM Rubber | 60 | 60 | 60 | 60 |
| Polypropylene | 40 | 40 | 40 | 40 |
| SP-1056 | — | 6.75 | — | — |
| Zinc Oxide | — | 1.25 | 3.0 | — |
| Tetramethyl Thiuram Disulfide | — | — | 0.6 | — |
| 2-bis(benzothiazolyl) Disulfide | — | — | 0.3 | — |
| Sulfur | — | — | 0.9 | — |
| 2,5-dimethyl-2,5-di(t-butylperoxy)hexane | — | — | — | 1.2 |
| Hardness, Shore D | 36 | 42 | 43 | 39 |
| 100% Modulus, Kg./cm$^2$ | 61 | 101 | 110 | 82 |
| 300% Modulus, Kg./cm$^2$ | — | 221 | 179 | 122 |
| UTS, Kg./cm$^2$ | 64 | 244 | 217 | 164 |
| Ult. Elong., % | 300 | 310 | 370 | 420 |
| Tension Set, % | 38 | 32 | 34 | 35 |
| Compression Set, % | 91 | 24 | 43 | 32 |
| #3 ASTM Oil Swell, % | 133 | 109 | 194 | 225 |
| Wt. % of sample soluble in cyclohexane @ R.T. | 48 | 0 | 0 | 1 |
| Wt. % of rubber soluble in cyclohexane @R.T. (uncorrected for acetone soluble portion of rubber) | 80 | 0 | 0 | 1.7 |

TABLE III

| Stocks | 1 | 2 | 3 | 4 | 5 | 6 | 7 |
|---|---|---|---|---|---|---|---|
| Oil-extended EPDM Rubber[1] | 91.2 | 91.2 | 91.2 | 100.6 | 100.6 | 124.4 | 124.4 |
| Polypropylene[2] | 54.4 | 54.4 | 54.4 | 49.7 | 49.7 | 37.8 | 37.8 |
| Extender Oil | 36.4 | 36.4 | 36.4 | 28.9 | 28.9 | 31.1 | 31.1 |

TABLE III-continued

| Stocks | 1 | 2 | 3 | 4 | 5 | 6 | 7 |
|---|---|---|---|---|---|---|---|
| Carbon Black | 36.4 | 36.4 | 36.4 | 28.9 | 28.9 | 18.66 | 18.66 |
| Flectol-H Antidegradant[3] | 0.91 | 0.91 | 0.91 | 0.96 | 0.96 | — | — |
| Zinc Oxide | 2.28 | 2.28 | 2.28 | 2.41 | 2.41 | 1.16 | 3.11 |
| Stearic Acid | 0.46 | 0.46 | 0.46 | 0.49 | 0.49 | 0.62 | 0.62 |
| SP-1056[2] | — | 4.1 | — | 4.43 | — | 6.84 | — |
| Sulfur Curative[2] | — | — | 1.65 | — | 1.82 | — | 2.25 |
| Hardness, Shore A | 81 | 83 | 84 | 82 | 81 | 71 | 71 |
| 100% Modulus, Kg./cm$^2$ | 30 | 53 | 46 | 46 | 44 | 34 | 29 |
| 300% Modulus, Kg./cm$^2$ | — | 110 | 87 | 101 | 86 | — | 60 |
| UTS, Kg./cm$^2$ | 44 | 141 | 150 | 134 | 150 | 91 | 69 |
| Ult. Elong., % | 500 | 410 | 550 | 390 | 560 | 290 | 350 |
| Tension Set., % | — | 14 | 14 | 12 | 11 | 6 | 17 |
| Compression Set, % | — | 30 | 47 | 28 | 49 | 20 | 34 |
| ASTM #3 Oil Swell, % | 167 | 52 | 69 | 52 | 84 | 59 | 91 |

[1]63 wt. % ethylene, 3.7 wt. % ethylidene norbornene, polydispersity 2.6, Sp. gr. 0.90, Mooney Visc. (ML-4, 125° C.) 50, terpolymer extended with 100 phr of non-staining naphthenic oil.
[2]Polypropylene and curatives same as Table I.
[3]Polymerized 1,2-dihydro-2,2,4-trimethylquinoline.

A study of the effect of curative level is shown in Table IV. The procedure and ingredients are the same as Table III. The data show that increasing curative level has less effect upon stress-strain properties with the sulfur curing system than with the phenolic resin curing system. Tensile strength is essentially unchanged when the curative concentration is varied in both curing systems. Modulus increases and elongation decreases with increasing phenolic curing resin concentration, whereas, modulus and elongation are essentially unchanged when the amount of sulfur curative is varied. At all concentrations studied, the compositions cured with phenolic curing resin exhibit better compression set and greater oil resistance.

Compositions of the invention cured with a nonhalogenated phenolic curing resin are illustrated in Table V. The procedure is the same as before. Stock 1 is a control containing no curatives. Stock 2 is a control containing phenolic curing resin but no cure activator. Stock 5 is another control containing sulfur curative. Stock 3 contains dimethylol-p-octyl phenol (phenolic curing resin sold under the trade name SP-1045). Stocks 3 and 4 contain stannous chloride and chlorosulfonated polyethylene, respectively, as halogen donors. The data show that it is critical that a cure activator be used in conjunction with nonhalogenated phenolic curative in order to fully cure the rubber. The presence of halogen donor (cure activator) results in substantial increases in tensile strength and significant improvement in compression set and oil resistance. The high oil swell for Stock 2 indicates that the rubber is only partially cured.

The data also show that the composition cured with the phenolic curing system containing halogen donor gives better compression set and oil resistance than a similar composition cured with sulfur curative. Stocks 3 and 4 show especially high retention of tensile strength after being swelled by oil.

TABLE IV

| | 1 | 2 | 3 | 4 | 5 | 6 | 7 | 8 | 9 |
|---|---|---|---|---|---|---|---|---|---|
| Oil-extended EPDM Rubber[1] | 91.2 | → | → | → | → | → | → | → | → |
| Polypropylene[2] | 54.4 | → | → | → | → | → | → | → | → |
| Extender Oil | 36.4 | → | → | → | → | → | → | → | → |
| Carbon Black | 36.4 | → | → | → | → | → | → | → | → |
| Zinc Oxide | 2.28 | → | → | → | → | → | → | → | → |
| Stearic Acid | 0.46 | → | → | → | → | → | → | → | → |
| Flectol-H Antidegradant | 0.91 | → | → | → | → | → | → | → | → |
| SP-1056[2] | — | 4.05 | 5.07 | 6.08 | 7.96 | — | — | — | — |
| Sulfur Curative[2] | — | — | — | — | — | 1.24 | 1.66 | 2.07 | 2.48 |
| Hardness, Shore A | 81 | 84 | 85 | 85 | 85 | 84 | 85 | 85 | 85 |
| 100% Modulus, Kg./cm$^2$ | 29 | 51 | 57 | 67 | 70 | 44 | 44 | 47 | 49 |
| UTS, Kg./cm$^2$ | 41 | 134 | 142 | 141 | 141 | 148 | 151 | 153 | 151 |
| Ult. Elong., % | 630 | 430 | 370 | 290 | 280 | 550 | 590 | 560 | 530 |
| Tension Set, % | 52 | 14 | 14 | 12 | 13 | 14 | 14 | 13 | 13 |
| Compression Set, % | 78 | 31 | 31 | 24 | 26 | 45 | 38 | 48 | 47 |
| ASTM #3 Oil Swell, % | 162 | 52 | 49 | 43 | 41 | 73 | 74 | 71 | 67 |

[1]Same as Table II.
[2]Same as Table I.

TABLE V

| Stocks | 1 | 2 | 3 | 4 | 5 |
|---|---|---|---|---|---|
| EPDM Rubber[1] | 36 | 36 | 36 | 36 | 36 |
| Polypropylene[2] | 64 | 64 | 64 | 64 | 64 |
| Extender Oil | 30.6 | 30.6 | 30.6 | 30.6 | 30.6 |
| Carbon Black | 28.8 | 28.8 | 28.8 | 28.8 | 28.8 |
| Zinc Oxide | 1.8 | 1.8 | 1.8 | 1.8 | 1.8 |
| Stearic Acid | 0.36 | 0.36 | 0.36 | 0.36 | 0.36 |
| SP-1045[3] | — | 4.32 | 4.32 | 4.32 | — |
| SnCl$_2$ | — | — | 0.72 | — | — |
| Chlorosulfonated Polyethylene | — | — | — | 1.8 | — |
| Sulfur Curative[2] | — | — | — | — | 1.08 |
| Hardness, Shore D | 37 | 42 | 45 | 45 | 43 |
| 100% Modulus, Kg./cm$^2$ | 72 | 102 | 146 | 129 | 114 |
| UTS, Kg./cm$^2$ | 95 | 170 | 226 | 223 | 211 |
| Ult. Elong., % | 510 | 450 | 260 | 380 | 410 |
| Tension Set, % | 48 | 29 | 27 | 29 | 32 |
| Compression Set, % | — | 57 | 36 | 39 | 49 |
| ASTM #3 Oil Swell, % | 79 | 86 | 44 | 55 | 66 |
| UTS after oil, Kg./cm$^2$ | 38 | 83 | 157 | 143 | 113 |

TABLE V-continued

| Stocks | 1 | 2 | 3 | 4 | 5 |
|---|---|---|---|---|---|
| % UTS Retention | 40.0 | 48.8 | 69.6 | 64.0 | 53.7 |

[1] 69 wt. % ethylene, 8.3 wt. % ethylidene norbornene, polydispersity 2.1, Sp. gr. 0.86, Mooney Visc. 50 (ML-8, 100° C.).
[2] Same as Table I.
[3] Dimethylol-p-octyl phenol (nonhalogenated).

The experiments shown in Table VI further demonstrate that in order to fully cure the rubber that a cure activator (zinc oxide) must be present. The procedure is the same as in Table I but a masterbatch is not used since the compositions contain neither carbon black nor extender oil. The composition of Stocks 1 and 2 is the same except Stock 2 contains no zinc oxide. Duplicate runs of Stock 2 are made with the average of the values obtained recorded in Table VI. The compositions are extracted with boiling xylene to determine the extent of cure of the rubber (cured rubber being insoluble in boiling xylene). Thin film (about 0.05 mm thick) specimens are placed in boiling xylene. After about 30 minutes, the film is usually disintegrated. The xylene suspension is then filtered through a glass fiber filter of 0.3 micron pore size. All of the ingredients except the polypropylene, stearic acid, and antidegradant are regarded as being part of the cured rubber. The filtrate is cooled to room temperature (R.T.) which causes the polypropylene (or crystalline graft copolymer) to precipitate which material is recovered by filtration. The second filtrate is then evaporated to recover the material which is soluble in xylene at room temperature (atactic polypropylene, low molecular weight polypropylene, amorphous ethylene-propylene copolymer, uncured EPDM rubber or non-crystalline polypropylene-EPDM rubber graft copolymer). The weight percent of the various materials recovered are recorded with the calculated theoretical values for cured EPDM rubber and polypropylene shown in parenthesis. The calculated value for cured rubber is corrected to take into account materials present in the uncured rubber which upon curing remain soluble in boiling xylene. The correction (1.6 weight percent of the rubber) is the sum of the acetone soluble portion of the uncured rubber, 0.9 wt.%, and the room temperature cyclohexane insoluble portion of the uncured rubber, 0.7 wt.%. The acetone soluble material is regarded as non-crosslinkable. The room temperature cyclohexane insoluble material is regarded as being polyolefin homopolymer. For example, in Stock 1, the calculated value indicated in parenthesis for insoluble rubber is 38.6 wt.%, which value would be 39.1 wt. percent if not corrected as indicated above. A similar correction is applied to the calculated values (in parenthesis in Tables VII-IX).

TABLE VI

| Stocks | 1 | 2 |
|---|---|---|
| EPDM Rubber[1] | 36 | 36 |
| Polypropylene[2] | 64 | 64 |
| Stearic Acid | 0.36 | 0.36 |
| Zinc Oxide | 1.8 | — |
| Flectol-H Antidegradant[2] | 0.72 | 0.72 |
| SP-1056[2] | 4.05 | 4.05 |
| Hardness, Shore D | 53 | 51 |
| 100% Modulus, Kg./cm² | 141 | 125 |
| 300% Modulus, Kg./cm² | 157 | 133 |
| UTS, Kg./cm² | 179 | 165 |
| Ult. Elong., % | 390 | 530 |
| Tension Set, % | 42 | 52 |
| Compression Set, % | 51 | 67 |
| ASTM #3 Oil Swell, % | 105 | 151 |
| Wt. % of sample insoluble in boiling xylene | 40.2 (38.6) | 76.2 (37.5) |
| Wt. % of rubber soluble in boiling xylene | 0 | 31.1 |
| Wt. % of sample insoluble in xylene @ R.T. | 55.0 | 56.7 |
| Wt. % of sample soluble in xylene @ R.T. | 4.7 | 17.8 |
| % Total | 99.9 | 100.8 |

[1] 55 wt. % ethylene, 4.4 wt. % ethylidene norbornene, polydispersity 2.5, Sp. gr. 0.86, Mooney Visc., 70 (ML 1 + 8 @ 121° C.), sulfur vulcanizable very fast curing.
[2] Same as Table I.

The data show that Stock 1, the composition containing zinc oxide, has better tension set and compression set and lower oil swell and that none of the rubber is extractable in boiling xylene. This indicates that the rubber is fully cured. It further confirms the absence of graft copolymer; where, in the composition containing no zinc oxide 31 percent of the rubber is extractable in boiling xylene. This indicates either the presence of graft copolymer or that the rubber is only partially cured. The data demonstrate that in order to obtain a composition of the invention containing fully cured rubber, it is critical that a cure activator is used to promote the reaction essentially entirely between the EPDM rubber and the phenolic curing resin.

Compositions of the invention of high hardness containing carbon black and high proportions of polypropylene are illustrated in Table VII. A masterbatch of EPDM rubber, carbon black, zinc oxide and stearic acid is mixed with polypropylene at 80 rpm in a Brabender mixer at 180° C. until the polypropylene melts and a uniform blend is obtained. Phenolic curing resin is added and mixing is continued until the maximum Brabender consistency is reached and three minutes thereafter. The composition is removed, sheeted, returned to the Brabender and mixed at 180° C. for two minutes. The data show that the compositions are harder and stiffer than compositions of the previous tables containing higher proportions of rubber. The tension set values indicate that the compositions have reduced elasticity. The solubility data show that the rubber is fully cured.

TABLE VII

| Stocks | 1 | 2 | 3 |
|---|---|---|---|
| EPDM Rubber[1] | 25 | 30 | 35 |
| Polypropylene[1] | 75 | 70 | 65 |
| Carbon Black | 20 | 24 | 28 |
| Stearic Acid | 0.25 | 0.3 | 0.35 |
| Zinc oxide | 1.25 | 1.5 | 1.75 |
| SP-1056[1] | 2.75 | 3.3 | 3.85 |
| Hardness | | | |
| Shore A | 97 | 99 | 99 |
| Shore D | 60 | 60 | 59 |
| 100% Modulus, Kg./cm² | 196 | 183 | 179 |
| 300% Modulus, Kg./cm² | 235 | 234 | 246 |
| UTS, Kg./cm² | 275 | 240 | 257 |
| Ult. Elong., % | 440 | 320 | 350 |
| Tension Set, % | 54 | 54 | 47 |
| Wt. % of sample insoluble in boiling xylene | 40.1 (39.1) | 45.4 (45.2) | 51.9 (50.8) |

[1] Same as Table VI.

TABLE VIII

| Stock No. | 1 | 2 | 3 | 4 | 5 | 6 | 7 | 8 | 9 |
|---|---|---|---|---|---|---|---|---|---|
| EPDM Rubber[1] | 50 | → | → | → | → | → | → | → | → |
| Polypropylene[1] | 50 | → | → | → | → | → | → | → | → |
| Stearic Acid | 0.5 | → | → | → | → | → | → | → | → |
| Zinc Oxide | 0.05 | 0.75 | 1.5 | 2.25 | 3.0 | — | — | — | — |
| SP-1056[1] | 5.65 | → | → | → | → | → | → | → | → |
| Zinc Oxide | — | — | — | — | — | 0.75 | 1.5 | 2.25 | 3.0 |
| 100% Modulus, Kg./cm$^2$ | 116 | 107 | 102 | 99 | 96 | 109 | 108 | 107 | 105 |
| 300% Modulus, Kg./cm$^2$ | 224 | 158 | 143 | 133 | 122 | 193 | 177 | 174 | 170 |
| UTS, Kg./cm$^2$ | 230 | 228 | 195 | 181 | 149 | 260 | 241 | 269 | 262 |
| Ult. Elong., % | 320 | 460 | 480 | 500 | 480 | 380 | 390 | 430 | 440 |
| Hardness, Shore D | 45 | 43 | 43 | 43 | 43 | 44 | 45 | 44 | 44 |
| Tension Set, % | 25 | 27 | 30 | 32 | 35 | 25 | 26 | 25 | 25 |
| Compression Set, % | 31 | 39 | 41 | 41 | 45 | 34 | 35 | 33 | 38 |
| Oil Swell, wt. % | 121 | 145 | 149 | 152 | 164 | 106 | 106 | 110 | 112 |
| Wt. % of sample insoluble boiling xylene | 52.5 (51.7) | 50.5 (52.0) | 46.4 (52.4) | 45.5 (52.7) | 42.3 (53.0) | 54.0 (52.0) | 53.7 (52.4) | 53.0 (52.7) | 54.0 (53.0) |
| Wt. % of rubber soluble boiling xylene | 0 | 3.0 | 13.4 | 16.0 | 23.0 | 0 | 0 | 0 | 0 |
| Wt. % of sample soluble in cyclohexane @ R.T. | 0.29 | 1.7 | 2.3 | 2.2 | 2.5 | 0.92 | 0.71 | 1.03 | 0.71 |
| Wt. % of rubber soluble in cyclohexane @ R.T. | 0 | 2.8 | 4.0 | 3.9 | 4.6 | 1.1 | 0.6 | 1.3 | 0.6 |

TABLE IX

| Stock | 1 | 2 | 3 | 4 | 5 | 6 |
|---|---|---|---|---|---|---|
| EPDM Rubber[1] | 60 | 50 | 40 | 30 | 20 | 10 |
| Polypropylene[1] | 40 | 50 | 60 | 70 | 80 | 90 |
| SP-1056[1] | 6 | 5 | 4 | 3 | 2 | 1 |
| Zinc Oxide | 1.2 | 1.0 | 0.8 | 0.6 | 0.4 | 0.2 |
| 100% Modulus, Kg./cm$^2$ | 99 | 121 | 141 | 170 | 180 | 205 |
| UTS, Kg./cm$^2$ | 261 | 241 | 284 | 248 | 264 | 234 |
| E, Kg./cm$^2$ | 496 | 787 | 2427 | 3566 | 4872 | 7577 |
| Ult. Elong., % | 380 | 430 | 460 | 440 | 510 | 570 |
| Hardness | | | | | | |
| Shore A | 89 | 92 | 98 | 95 | 97 | 97 |
| Shore D | 44 | 48 | 52 | 60 | 65 | 71 |
| Tension Set, % | 18 | 27 | 43 | 49 | 60 (necked) | 85 (necked) |
| Wt. % of sample insoluble boiling xylene | 62.8 (61.8) | 51.7 (52.1) | 44.0 (42.1) | 31.4 (32.0) | 21.7 (21.6) | 12.0 (10.9) |
| Wt. % of rubber soluble boiling xylene | 0 | 0.8 | 0 | 2.0 | 0.5 | 0 |

[1]Same as Table VI.

The order of addition of the ingredients is important, especially the sequence in which cure activator such as zinc oxide is added. This is especially true with adding large amounts of zinc oxide in the absence of a filler. This is illustrated in Table VIII. The procedure is the same as in Table I but no masterbatch is used since no carbon black and extender oil are present. The ingredients are added in the order listed. In Stocks 1-5, the zinc oxide is added prior to the adding of the phenolic curing resin, whereas, in Stocks 6-9, the zinc oxide is added after the phenolic curing resin. The data show that the stress-strain properties decrease with increasing amounts of zinc oxide when the zinc oxide is added before the phenolic curing resin but that the amount of zinc oxide has little effect on stress-strain properties when zinc oxide is added last. Also, the data indicate that superior compositions are obtained when the zinc oxide is added last. Such compositions exhibit higher stress-strain properties, better tension set and compression set and greater oil resistance. The solubility data indicate that the order of the zinc oxide addition has a significant effect upon the extent of cure of the rubber. The amount of rubber soluble in boiling xylene varies from 0 to 23 percent depending upon the amount of zinc oxide in the compositions (Stocks 1-5) when the zinc oxide is added before the phenolic curing resin, whereas, the amount of rubber soluble in boiling xylene is zero in Stocks 6-9, when the zinc oxide is added last. The cyclohexane solubility data at room temperature also show that a greater portion of the rubber is soluble in compositions when the zinc oxide is present before the phenolic curing resin is added. The weight percent of rubber soluble in cyclohexane is corrected to take into account of the acetone soluble portion of the uncured rubber, 0.9 wt. percent.

A study in which the proportions of EPDM rubber and polypropylene are varied is shown in Table IX. The compositions contain only EPDM rubber, polypropylene, phenolic curing resin and zinc oxide. The amount of zinc oxide and phenolic curing agent are varied to maintain a constant curative to rubber ratio of 2 parts by weight zinc oxide and 10 parts by weight phenolic curing resin per 100 parts by weight of rubber. The EPDM rubber and polypropylene are charged to a Brabender mixer at 180° C. and mixed at 100 rpm. Three minutes after the polypropylene melts, phenolic curing resin is added and mixing is continued for one minute. Zinc oxide is then added and mixing is continued for another four minutes. The composition is removed, sheeted, returned to the Brabender mixer and mixed for two additional minutes. The composition is again removed from the mixer and formed into sheets and compression molded at 220° C. All the compositions are thermoplastic and Stocks 1-4 are elastomeric. Stocks 5 and 6 containing high proportions of polypropylene are non-elastomeric with necking occurring when test specimens are pulled, i.e., the test specimen goes through a yield preventing its return to its original form. Over the entire range of proportions, the rubber is fully cured with the amount of the rubber soluble in boiling xylene being two weight percent or less.

Colorable compositions of the invention containing non-black particulate fillers and a composition of the invention containing polyethylene are illustrated in Table X. The composition of Stock 1 contains (all parts by weight) 50 parts EPDM rubber, 50 parts polypropylene, 40 parts magnesium silicate (filler grade), 0.5 parts stearic acid and 5.6 parts phenolic curative, SP-1056. The preparation procedure is the same as in Table VIII, except the magnesium silicate is completely dispersed before the phenolic curative is added. No zinc oxide is required when magnesium silicate is used. The cyclohexane solubility data indicate that the rubber is fully cured. The composition of Stock 2 contains (all parts by weight) 40 parts EPDM rubber, 60 parts polyethylene, 0.4 parts stearic acid, 0.8 parts zinc oxide and 4.5 parts phenolic curing resin, SP-1056. The rubber and polyethylene are charged to a Brabender mixer at 180° C. and masticated at 80 rpm until the polyethylene melts. Stearic acid and phenolic curative are added with mixing continuing until a uniform mass is obtained. Zinc oxide is added and mixing is continued for 2 minutes beyond the time (about 3-4 minutes) when maximum consistency is reached. The composition obtained is thermoplastic and elastomeric. The solubility data indicate that the rubber is fully cured. The composition of Stock 3 (all parts by weight) illustrates a soft composition containing non-black filler which composition may be readily tinted by addition of pigments or dyes. The kaolin clay is a mercaptosilane-modified clay having a median particle size of 0.3 microns and B.E.T. surface area of 22 m$^2$/g. The preparation procedure comprises charging to a 1-A Banbury mixer at about 170° C. a masterbatch consisting of EPDM rubber, 80% of the extender oil, kaolin clay and titanium dioxide. The polypropylene and all other ingredients (except phenolic curing resin and remainder of extender oil) are then charged and mixed for 4.5 minutes. The phenolic curing resin is then added and mixing is continued for 2 minutes. The remainder of the extender oil is then added and mixing is continued for an additional 2.5 minutes. The batch is then dumped with the batch temperature at about 207° C. The composition, while still hot, is sheeted on a mill then cooled and diced. Pellets are prepared by feeding the diced material through an extruder and chopping the extruded strand. Test specimens are prepared by compression molding at 210° C. Properties are shown in Table X.

Compositions of the invention using different cure activators are illustrated in Table XI. The EPDM rubber contains 55 weight percent ethylene, 40.6 weight percent propylene and 4.4 weight percent dicyclopentadiene and has a polydispersity of 6.0. The polypropylene is the same as in Table I. The phenolic curing resin is added last. Stock 1, a control, contains no cure activator. The properties of the composition show that the rubber is incompletely cured (or possibly a graft copolymer is obtained). This is confirmed by the cyclohexane solubility data. Stocks 2, 3 and 4 contain zinc oxide, zinc stearate and stannous chloride, respectively, as cure activators. The data indicate that the rubber in the blends is essentially completely cured. The percent of the rubber soluble in cyclohexane is corrected to take into account that 1.38 weight percent of the uncured rubber is soluble in acetone. The corrected value is indicated by asterisk. Stocks 4 and 5 show that a non-halogenated phenolic curing resin may be substituted in place of halogenated phenolic curing resin when using stannous chloride as activator and that the resulting elastoplastic compositions exhibit substantially the same properties.

It is important that cure activator(s) is present and that the proper concentration is used; without cure activator or at improper concentrations the rubber is not completely cured. Incomplete cure results in diminution of properties of the blend. High concentrations of activators, especially when added prior to the phenolic curing resin, are believed to cause the curing resin to react with itself (homopolymerization), thus depleting the system of curative. The proper activator concentration varies depending upon type of activator, phenolic curing resin or rubber, order of addition of phenolic curing resin and activator, and processing temperature but the proper level may be readily ascertained by trial.

TABLE X

| Stocks | 1 | 2 | 3 |
|---|---|---|---|
| EPDM Rubber[1] | 50 | 40 | — |
| EPDM Rubber[2] | — | — | 62.5 |
| Polypropylene[2] | 50 | — | 37.5 |
| Kaolin Clay | — | — | 23.1 |
| Polyethylene[3] | — | 60 | — |
| Extender Oil (paraffinic) | — | — | 78.13 |
| Magnesium Silicate | 40 | — | — |
| Magnesium Oxide | — | — | 0.13 |
| Titanium Oxide | — | — | 3.13 |
| Stearic Acid | 0.5 | 0.4 | — |
| Chlorosulfonated polyethylene (Hypalon 20) | — | — | 3.13 |
| Zinc Oxide | — | 0.8 | 1.25 |
| 2,5-di(tert-amyl)hydroquinone | — | — | 0.94 |
| SP-1056[1] | 5.6 | 4.5 | — |
| Octylphenol/formaldehyde curing resin (Arofene 9273) | — | — | 5.63 |
| Hardness | 46 (Shore D) | 44 (Shore D) | 72 (Shore A) |
| 100% Modulus, Kg./cm$^2$ | 133 | 102 | 34.5 |
| 300% Modulus, Kg./cm$^2$ | 166 | 158 | — |
| UTS, Kg./cm$^2$ | 190 | 190 | 86.5 |
| Ult. Elong., % | 420 | 370 | 370 |
| Tension Set, % | 26 | 32 | 11 |
| Compression Set, % | 28 | 27 | 17 |
| ASTM #3 Oil Swell, % | — | — | 87 |
| Wt. % of sample insoluble boiling xylene | 64.0 (64.9) | 46.8 (42.3) | — |
| Wt. % of rubber soluble | 1.8 | 0 | — |
| Wt. % of sample soluble in cyclohexane @ R.T. | 0.1 | 0.2 | — |

[1]Same as Table VI.
[2]Same as Table I, Stock 1.
[3]Medium molecular wt. distribution polyethylene, ASTM D1248-72, Type III, Class A, category 5, melt index 0.3g/10 min., density 0.950 g/cm$^3$.

TABLE XI

| Stocks | 1 | 2 | 3 | 4 | 5 |
|---|---|---|---|---|---|
| EPDM Rubber | 50 | 50 | 50 | 50 | 50 |
| Polypropylene | 50 | 50 | 50 | 50 | 50 |
| Stearic Acid | 0.5 | 0.5 | 0.5 | 0.5 | 0.5 |
| ZnO | — | 0.5 | — | — | — |
| Zinc Stearate | — | — | 0.2 | — | — |
| SnCl$_2$—2H$_2$O | — | — | — | 1 | 1 |
| Phenolic Curing Resin | 5.63[1] | 5.63[1] | 5.63[1] | 5.63[1] | 5.63[1] |

TABLE XI-continued

| Stocks | 1 | 2 | 3 | 4 | 5 |
|---|---|---|---|---|---|
| Hardness, Shore D | 29 | 41 | 41 | 40 | 44 |
| 100% Modulus, Kg./cm$^2$ | 72 | 95 | 93 | 100 | 102 |
| 300% Modulus, Kg./cm$^2$ | — | 148 | 140 | 147 | 137 |
| UTS, Kg./cm$^2$ | 70 | 214 | 212 | 221 | 190 |
| Ult. Elong., % | 100 | 450 | 470 | 480 | 470 |
| Tension Set, % | 57 | 32 | 32 | 30 | 32 |
| Compression Set, % | 83 | 38 | 39 | 46 | 45 |
| ASTM #3 Oil Swell, % | 212 | 133 | 134 | 140 | 147 |
| Wt. % of sample soluble in cyclohexane @ R.T. | 21 | 2.2 | 1.6 | 0.4 | 0 |
| Wt. % of rubber soluble in cyclohexane @ R.T. | 40 / 38.6* | 4.2 / 2.8* | 3.0 / 1.6* | 0.8 / 0* | 0 / 0 | cure activator is added last in Stocks 1–6. In Stock 7, the stannous chloride is added before the phenolic curing resin is added after which the zinc oxide is added. The uncorrected calculated value for insoluble rubber; calculated assuming that all ingredients except polypropylene and stearic acid become insoluble upon curing are shown in parenthesis. Values designated by asterisk are calculated by taking into account the weight percent of the uncured rubber which is acetone soluble and cyclohexane insoluble as shown in the upper part of the table where the rubber characteristics are listed. The data show that all the compositions exhibit good stress-strain properties and that the polydispersity of the rubber has no pronounced effect upon extent of cure. All compositions exhibit satisfactory oil swell and compression set. The solubility data show that the rubber in all the compositions is completely cured.

TABLE XII

| | 1 | 2 | 3 | 4 | 5 | 6 | 7 |
|---|---|---|---|---|---|---|---|
| EPDM Rubber | | | | | | | |
| Ethylene, wt. % | 55 | 55 | 65 | 55 | 56 | 70 | 55 |
| Monomer type | ENB | ENB | 1,4HD | 1,4HD | 1,4HD | 1,4HD | DCPD |
| Monomer, wt. % | 4.4 | 2.6 | 3.7 | 5.0 | 3.7 | 3.7 | 4.4 |
| Polydispersity | 5.2 | — | 2.5 | >20 | 19.4 | 8 | 6.0 |
| Mooney, Visc. (ML, 1 + 8 @ 100° C.) | 60 | 90 | 80 | 90 | 39 | 33 | 45 |
| Acetone Soluble | 0.39 | 0.87 | 0.8 | 4.13 | — | — | 1.38 |
| Cyclohexane Insoluble | — | 0.71 | 0.37 | — | — | 2.52 | 0.8 |
| Parts by Weight | | | | | | | |
| EPDM Rubber | 50 | → | → | → | → | → | → |
| Polypropylene | 50 | → | → | → | → | → | → |
| Stearic Acid | 0.5 | → | → | → | → | → | → |
| Zinc Oxide | 1 | 1 | — | — | — | — | 0.5 |
| SnCl$_2$ . 2H$_2$O | — | — | 1 | 1 | 1 | 1 | 1 |
| Phenolic Curing Resin SP-1056[1] SP-1045[2] | 5.63[1] | 5.63[1] | 5.63[2] | 5.63[2] | 5.63[1] | 5.63[1] | |
| Stocks | | | | | | | |
| Hardness, Shore D | 46 | 44 | 44 | 44 | 44 | 49 | 44 |
| 100% Modulus, Kg./cm$^2$ | 105 | 98 | 108 | 101 | 104 | 133 | 110 |
| 300% Modulus, Kg./cm$^2$ | 166 | 153 | 178 | 133 | 160 | 177 | 169 |
| UTS, Kg./cm$^2$ | 225 | 247 | 240 | 209 | 186 | 250 | 245 |
| Ult. Elong., % | 390 | 480 | 440 | 500 | 370 | 460 | 430 |
| Tension Set, % | 29 | 27 | 28 | 34 | 29 | 54 | 30 |
| Compression Set, % | 36 | 36 | 37 | 30 | 34 | 41 | 37 |
| ASTM #3 Oil Swell, % | 114 | 122 | 116 | 116 | 130 | 129 | 122 |
| Wt. % of sample insoluble in boiling xylene | 51.8 (52.9) 52.7* | 52.7 (52.9) 52.1* | 52.9 (52.9) 52.3 | 50.3 (52.9) 50.9* | 51.3 (52.9) | 49.8 (52.9) 51.7* | 50.2 (53.3) 52.6* |
| Wt. % of rubber soluble in boiling xylene | 2.2 1.8* | 0.4 0* | 0 0* | 5.2 1.2* | 3.2 | 6.2 3.8* | 6.2 4.8* |
| Wt. % of sample insoluble in xylene @ R.T. | 42.9 | 42.1 | 44.7 | 42.5 | 42.1 | 46.5 | 43.6 |
| Wt. % of sample soluble in xylene @ R.T. | 5.0 | 4.8 | 3.7 | 7.6 | 6.5 | 4.7 | 6.1 |
| Wt. % of sample soluble in cyclohexane @ R.T. | 0.8 | 0.8 | 0.9 | 3.1 | 0.9 | 1.3 | 1.3 |
| Wt. % of rubber soluble in cyclohexane @ R.T. | 1.5 | 1.5 | 1.7 | 5.8 / 1.7* | 1.7 | 2.4 | 2.4 / 1.0* |

[1]halogenated phenol curing resin same as Table I.
[2]non-halogenated phenol curing resin same as Table V.

Compositions of the invention in which the EPDM rubber contains different monomers are illustrated in Table XII. Stocks 1 and 2 illustrate compositions containing EPDM rubber wherein the unsaturation is derived from ethylidene norbornene (ENB). Stocks 3–6 illustrate compositions containing EPDM rubber containing unsaturation derived from 1,4-hexadiene (1,4HD). Stock 7 illustrates a composition containing EPDM rubber containing unsaturation derived from dicyclopentadiene (DCPD). The compositions are prepared in accordance to the procedure of Table I except for Stock 7 the Brabender temperature is 170° C. the Improved processability of compositions of the invention is illustrated by comparing the extrusion characteristics of blends cured with phenolic curatives with blends cured with sulfur curatives. For example, 12.7 mm O.D. tubing is prepared by extruding compositions similar to stocks 2 and 3 of Table I through 12.7 mm OD×9.53 mm ID die (20:1 L/D) at 381 cm/min. take-off rate using a 3.81 cm diameter Davis-Standard extruder equipped with 24.1 L/D general purpose screw operated at 70 rpm. Tubing size is maintained by slight internal air pressure and a water quench, Barrel temperature is varied over a practicable processing range—from a temperature sufficient to completely melt the polypropylene, 193° C., to a temperature where excessive fuming occurs, 232° C. An intermediate temperature condition of 216° C. is also studied. Another variable studied is draw down ratio which measures the integrity of the composition by its extensibility at processing temperature. Draw down ratio is the ratio of the die annulus area to the cross-sectional area of the tubing drawn down in diameter to failure by progressively increasing the take off rate. The results of the study are summarized in Table XIII.

The data show that the composition prepared with phenolic curative is more processable than the composition prepared with sulfur curative. In particular, the data show that phenolic resin cured composition may be extruded over a wide temperature range and permits preparation of a broad range of tube sizes as indicated by the area ratio.

Improved processability of compositions of the invention is further illustrated by comparing the extrusion characteristics of compositions similar to Stocks 6 and 7 of Table III. For example, 5 mm rod is prepared by extruding the aforesaid compositions through a 5.08 mm rod die using a 2.54 cm diameter NRM extruder equipped with 16:1 L/D general purpose screw operated at 60 rpm. Barrel temperature is varied from 180°-190° C. to 210°-220° C. The results are shown in Table XIV. The data show that the composition prepared with phenolic curative may be extruded at higher rates giving tubing with smoother surfaces than the composition prepared with sulfur curatives.

It is understood that compositions of the invention comprise blends of polyolefin resin and dispersed sufficiently small particles of cross-linked rubber to give strong compositions processable as thermoplastics. Rubber particle size of 50μ number average are satisfactory with particle size of 50μ weight average being preferred. In more preferred compositions, the rubber particle size is 5μ or less number average.

Compositions of the invention containing high proportions of EPDM rubber are illustrated in Table XV. The EPDM rubber and polypropylene are charged to a Brabender mixer at 180° C. and masticated at 100 rpm until the polypropylene melts and a homogeneous mixture is obtained. A halogen-donating polymer (chlorosulfonated polyethylene rubber, Hypalon 20) is added and mixed for 2 minutes. Phenolic curing resin is added and then zinc oxide is added about 0.5 minutes later. The zinc oxide is added as a 70% by weight blend with polypropylene (the 30% by weight of polypropylene in the ZnO blend is computed and shown as part of the total amount of polypropylene in the recipe). The mixture is masticated for about another 6 minutes. The mixture is removed, sheeted on a mill and test specimens are molded at 210°-220° C. The properties are shown in Table XV. The compositions are processable as thermoplastics, namely, the molded specimens can be masticated again in the Brabender mixer and sheeted on a rubber mill. The sheeted material can be cut into pieces and the pieces compression molded at a temperature above the melting point of the polypropylene to give an integral molded piece.

TABLE XIII

| Sample Type | Barrel Temp., 193° C. | | Barrel Temp., 216° C. | | Barrel Temp., 232° C. | |
|---|---|---|---|---|---|---|
| | Phenolic Curative | Sulfur Curative | Phenolic Curative | Sulfur Curative | Phenolic Curative | Sulfur Curative |
| Extrudate temp., °C. | 197 | 203 | 218 | 218 | 232 | 234 |
| Output Rate g./min. | 199.5 | 201.8 | 186.0 | 189.0 | 182.5 | 171.2 |
| Tube Dimensions, @ 381 cm/min. take off rate | | | | | | |
| O.D., mm | 12.85 | 12.9 | 12.7 | 12.37 | 12.7 | 12.17 |
| I.D., mm | 9.91 | 9.91 | 9.91 | 9.53 | 9.91 | 9.53 |
| Appearance | smooth | rough | smooth | smooth | smooth | smooth |
| Tube Dimensions @ max. draw down | | | | | | |
| O.D., mm | 7.7 | 9.68 | 5.46 | 6.15 | 5.46 | 7.11 |
| I.D., mm | 5.94 | 7.54 | 4.37 | 4.52 | 4.37 | 5.56 |
| Area Ratio | 3.0 | 1.9 | >6.8* | 4.1 | 6.8 | 3.7 |
| Appearance | smooth | v. rough, fractured | smooth | rough | smooth | v. rough |
| Odor | mild | mild | mild | H₂S oror | mild | offensive |

*machine limit - no break

TABLE XIV

| Sample Type | Barrel Temp., 180-190° C. | | Barrel Temp., 210-220° C. | |
|---|---|---|---|---|
| | Phenolic Curative | Sulfur Curative | Phenolic Curative | Sulfur Curative |
| Output Rate g./min. | 43.5 | 39.2 | 41.5 | 34.1 |
| Surface Appearance | smooth | rough-knobby, many 0.13-.25 mm protrusions | smooth | rough-knobby, many 0.13-.25 mm protrusions |

TABLE XV

| Stock | 1 | 2 | 3 | 4 |
|---|---|---|---|---|
| EPDM Rubber[1] | 85 | 80 | — | — |
| Polypropylene[1] | 15 | 20 | 18.6 | 40.1 |
| Chlorosulfonated Polyethylene | 5 | 4 | — | — |
| Octylphenol/formaldehyde Curing Resin | 9.6 | 9.0 | — | — |
| Zinc Oxide | 2 | 1.6 | — | — |
| Composition of Stock 2 | — | — | 81.4 | 59.9 |
| Hardness, Shore A | 78 | 82 | 92 | 97 |
| 100% Modulus, Kg./cm² | 35.2 | 52.7 | 77.3 | 116.0 |
| UTS, Kg./cm² | 107.6 | 140.6 | 260.1 | 251.7 |
| Ult. Elong., % | 320 | 340 | 480 | 520 |
| Tension Set, % | 14 | 18 | 31 | 49 |
| Compression Set, % | 12 | 13 | 25 | 37 |
| ASTM #3 Oil Swell, % | 204 | 181 | 154 | 124 |
| Wt. % of sample in soluble in boiling xylene | 83.9 (86.8) | 79.0 (82.2) | — | — |

TABLE XV-continued

| Stock | 1 | 2 | 3 | 4 |
|---|---|---|---|---|
| Wt. % of rubber soluble | 3.4 | 4.0 | — | — |

[1] Same as Table I, Stock 1.

Portions of the cured composition of Stock 2 are masticated in a Brabender mixer at 190° C. with additional polypropylene in the proportions indicated to give Stocks 3 and 4. Test specimens are molded in the same manner as before. The data of Table XV show that blends may be prepared exhibiting a broad range of properties by mixing additional polypropylene to a previously prepared blend of polypropylene and cured EPDM rubber. The properties of the blends prepared by subsequent addition of polypropylene are quite similar to properties of blends containing the same proportion of ingredients prepared directly by charging all the ingredients at the same time.

An alternative method for determining the amount of uncured EPDM rubber in cured compositions of the invention comprises the quantitative determination of the EPDM rubber by infrared spectral analysis as follows: A sample weighing about one gram in the form of a thin film is exhaustively extracted in boiling xylene. After cooling to room temperature, the insoluble material including cross-linked rubber, crystalline polypropylene, and solid fillers are recovered by filtration through a 0.2 micron filter. The filtrate containing a soluble material including uncured EPDM rubber, atactic polypropylene, extender or processing oils, and antidegradants is evaporated under a nitrogen atmosphere until substantially all of the xylene is removed. The resulting concentrate is diluted with cyclohexane. Any uncured EPDM rubber and atactic polypropylene is then precipitated by the addition of acetone. The precipitate is recovered by centrifuging and weighed. It is then cast into a film which film is then analyzed by infrared spectroscopy. The weight of uncured rubber is calculated as follows:

The weight of uncured EPDM rubber =
$$\text{weight of precipitate} \times \frac{A718}{A718 + K(A975 - FA718)}$$

where
A718 is the absorbance at 718 cm$^{-1}$ (EPDM rubber),
A975 is the absorbance at 975 cm$^{-1}$ (atactic polypropylene),
K is the response ratio for EPDM rubber versus atactic polypropylene determined from known standard compositions, and
F is the base line correction which is obtained by dividing the absorbance at 975 cm$^{-1}$ by the absorbance at 718 cm$^{-1}$ of the EPDM rubber.

The percent of uncured EPDM rubber is then calculated based on the weight fraction of the curable EPDM rubber in the original composition. Curable EPDM rubber is the quantity of the EPDM rubber present in the composition prior to curing which is cross-linkable with phenolic curative. Thus, any noncross-linkable polymer which is acetone soluble and/or cyclohexane insoluble is not curable EPDM rubber.

As indicated in certain embodiments of the invention, the rubber is cured to a high gel content. The extent of cure can also be indicated by the crosslink density of the rubber which is related to the amount of phenolic curative. Thus, the broad invention embraces improved blend compositions in which the rubber is cured with phenolic curative comprising phenolic curing agent and cure activator without limitation to an absolute amount of insoluble rubber in the blend. The use of cure activator increases the crosslink density of the rubber. This gives compositions exhibiting improved properties (tensile strength, tension set, compression set, oil resistance) which improvements are obtained regardless of the precise extent of cure as determined by soluble rubber. Sufficient activator is used to increase the extent of cure of the rubber enough to obtain an improvement in one or more of the above properties. Property improvement is generally greater with either increasing amounts of curative or increasing gel content of the rubber. Accordingly, elastoplastic compositions of the invention comprise a blend of polyolefin resin and EPDM rubber in which the EPDM rubber is cured with phenolic curative comprising about 5 parts to 20 parts by weight of phenolic curing agent and 0.01 to 10 parts by weight of cure activator per 100 parts by weight of EPDM rubber. The compositions are prepared by masticating the blend at curing temperature until the rubber is cured with the extent of cure being determined by the amount of phenolic curative used.

Although the invention has been illustrated by typical examples, it is not limited thereto. Changes and modifications of the examples of the invention herein chosen for purposes of disclosures can be made which do not constitute departure from the spirit and scope of the invention.

The embodiments of the invention in which an exclusive property or privilege is claimed are defined as follows:

1. In an elastoplastic composition comprising a blend of thermoplastic crystalline polyolefin resin and fully cured EPDM rubber in the form of small dispersed particles essentially of a size of about 50 microns number average or below, the improvement comprising a composition in which the rubber is cured with phenolic curative comprising phenolic curing resin and cure activator to the extent that the cured composition contains no more than about three percent by weight of curable rubber extractable in cyclohexane at 23° C. or no more than about five percent by weight of curable rubber extractable in boiling xylene.

2. The composition of claim 1 comprising a blend of about 15–75 parts by weight polyolefin resin and about 85–25 parts by weight of cured EPDM rubber per 100 parts total weight of resin and rubber.

3. The composition of claim 2 comprising a blend of about 25–75 parts by weight polyolefin resin and about 75–25 parts by weight of cured EPDM rubber per 100 parts total weight of resin and rubber.

4. The composition of claim 3 in which the polyolefin resin is polypropylene.

5. The composition of claim 4 containing about 30–250 parts by weight of extender oil per 100 parts by weight of rubber.

Weight percent of uncured EPDM rubber =
$$\frac{\text{weight of uncured EPDM rubber} \times 100}{\text{weight of sample} \times \text{weight fraction of curable EPDM rubber in uncured composition}}$$

6. The composition of claim 5 containing about 2–250 parts by weight carbon black per 100 parts by weight rubber.

7. The composition of claim 4 in which the phenolic curing resin is non-halogenated dimethylol-p-($C_5$–$C_{10}$ alkyl) phenol.

8. The composition of claim 7 in which the cure activator is selected from the group consisting of metal halide and halogen-donating polymer.

9. The composition of claim 8 in which the halogen-donating polymer is chlorosulfonated polyethylene.

10. The composition of claim 9 in which the cure activator system includes zinc oxide.

11. The composition of claim 4 in which the phenolic curative comprises a brominated phenolic curing resin and a metal oxide cure activator.

12. The composition of claim 11 in which the metal oxide is zinc oxide.

13. The composition of claim 3 in which the polyolefin resin is polyethylene.

14. The composition of claim 4 in which the EPDM rubber is a terpolymer of ethylene, propylene and ethylidene norbornene.

15. The composition of claim 4 in which the rubber is cured to the extent that no more than about five weight percent of the rubber is extractable in boiling xylene.

16. The composition of claim 15 in which the rubber is cured to the extent that no more than about three weight percent of the rubber is extractable in boiling xylene and the rubber is of the size of about 5 microns number average or below.

17. The composition of claim 14 in which the rubber is cured to the extent that no more than about five weight percent of the rubber is extractable in boiling xylene.

18. The composition of claim 4 in which the rubber is cured to the extent that no more than about three percent of the rubber in the blend is extractable in cyclohexane at 23° C.

19. The composition of claim 1 prepared by masticating the blend and phenolic curative, in an amount sufficient to cure the rubber, at curing temperature until the rubber is cured to the extent that no more than about five percent of the rubber is extractable in boiling xylene.

20. The composition of claim 4 comprising a blend of about 30–70 parts by weight polypropylene, about 30–70 parts by weight EPDM rubber, and 5–300 parts by weight extender oil per 100 parts total weight of polypropylene and rubber, and 10–100 parts by weight particulate filler per 100 parts total weight of rubber and extender oil.

21. The filled composition of claim 20 in which the particulate filler is carbon black.

22. The filled composition of claim 20 in which the particulate filler is non-black filler.

23. The filled composition of claim 22 in which the filler is kaolin clay.

24. The filled composition of claim 23 containing silane coupling agent.

25. The composition of claim 10 in which the phenolic curing resin is dimethylol-p-octyl phenol.

26. An elastoplastic composition comprising a blend of thermoplastic crystalline polyolefin resin, in an amount sufficient to impart thermoplasticity to the composition, and cured EPDM rubber in the form of small dispersed particles essentially of a size of about 50 microns number average or below, in an amount sufficient to impart rubber-like elasticity to the composition, in which the rubber is cured with phenolic curative comprising phenolic curing resin and cure activator to the extent that no more than about five percent of curable rubber is extractable in boiling xylene.

27. The composition of claim 26 in which the rubber is cured to the extent that no more than about three percent of the rubber in the blend is extractable in cyclohexane at 23° C.

28. The composition of claim 27 comprising a blend of about 15–75 parts by weight polyolefin resin and about 85–25 parts by weight of cured EPDM rubber per 100 parts total weight of polyolefin resin and rubber.

29. The composition of claim 28 comprising a blend of about 25–75 parts by weight polyolefin resin and about 75–25 parts by weight of cured EPDM rubber per 100 parts total weight of polyolefin resin and rubber.

30. The composition of claim 29 in which the polyolefin resin is polypropylene.

31. The composition of claim 30 in which the rubber is a terpolymer of ethylene, propylene, and ethylidene norbornene.

32. The composition of claim 26 containing about 30 to 250 parts by weight of extender oil per 100 parts by weight of rubber.

33. The composition of claim 26 in which the rubber is cured with a brominated phenolic curing resin.

34. The composition of claim 33 in which the rubber is cured with a brominated phenolic curing resin and zinc oxide cure activator.

35. The composition of claim 33 containing halogen-donating polymer.

36. The composition of claim 26 in which the phenolic curing resin is non-halogenated dimethylol-p-($C_5$–$C_{10}$ alkyl) phenol.

37. The composition of claim 36 wherein the cure activator is selected from the group consisting of metal halide and halogen-donating polymer.

38. The composition of claim 37 in which the halogen-donating polymer is chlorosulfonated polyethylene.

39. The composition of claim 38 in which the cure activator system includes zinc oxide.

40. The composition of claim 30 comprising a blend of about 30 to 70 parts by weight polypropylene, about 30 to about 70 parts by weight of EPDM rubber, and 5–300 parts by weight extender oil per 100 parts total weight of polypropylene and rubber, and 10–100 parts by weight particulate filler per 100 parts total weight of rubber and extender oil.

41. The filled composition of claim 40 in which the particulate filler is carbon black.

42. The filled composition of claim 40 in which the particulate filler is a non-black filler.

43. The filled composition of claim 42 in which the filler is kaolin clay.

44. The filled composition of claim 43 containing silane coupling agent.

45. The composition of claim 30 in which the cured EPDM rubber is of the size of about 5 microns number average or below.

46. The composition of claim 40 in which the cured EPDM rubber is the size of about 5 microns number average or below.

47. The composition of claim 26 prepared by masticating the blend and phenolic curative, in an amount sufficient to cure the rubber, at curing temperature until the rubber is cured to the extent that no more than about five percent of the rubber is extractable in boiling xylene.

48. A process for preparing elastoplastic compositions which comprises (1) masticating about 15–75 parts by weight of EPDM rubber and 85–25 parts by weight thermoplastic crystalline polyolefin resin per 100 total parts by weight of rubber and polyolefin resin, and phenolic curing resin, in an amount sufficient to cure the rubber, at a temperature sufficient to soften or melt the polyolefin resin; and, for a time, sufficient to obtain a homogeneous mixture in which the rubber is in the form of small dispersed particles essentially of a size of about 50 microns number average or below, (2) adding cure activator, (3) continuing masticating the mixture at curing temperature until the rubber is cured to the extent that no more than about five percent of curable rubber is extractable in boiling xylene.

49. The process of claim 48 in which the phenolic curing agent is brominated phenolic curing resin.

50. The process of claim 49 in which the cure activator is zinc oxide.

51. The process of claim 48 in which the phenolic curing resin is non-halogenated dimethylol-p-($C_5$–$C_{10}$ alkyl) phenol.

52. The process of claim 51 in which the cure activator comprises chlorosulfonated polyethylene and zinc oxide.

53. The process of claim 52 in which the phenolic curing resin is dimethylol-p-octyl phenol.

54. The process of claim 48 in which the polyolefin resin is polypropylene.

55. An elastoplastic composition comprising a blend of thermoplastic crystalline polyolefin resin, in an amount sufficient to impart thermoplasticity to the composition, and EPDM rubber, in an amount sufficient to impart rubber-like elasticity to the composition, in which the EPDM rubber is cured with phenolic curative comprising about 5 parts to 20 parts by weight phenolic curing resin and about 0.01 to 10 parts by weight cure activator per 100 parts by weight of EPDM rubber.

56. The composition of claim 55 comprising a blend of about 15–75 parts by weight of polyolefin resin and about 85–25 parts by weight of EPDM rubber per 100 parts total weight of polyolefin resin and EPDM rubber.

57. The composition of claim 56 comprising a blend of about 25–75 parts by weight of polyolefin and about 75–25 parts by weight of EPDM rubber per 100 total parts by weight of polyolefin resin and EPDM rubber.

58. The composition of claim 57 in which the polyolefin resin is polypropylene.

59. The composition of claim 58 in which the phenolic curative comprises about 7 to 14 parts by weight of phenolic curing agent per 100 total parts by weight of EPDM rubber.

60. The composition of claim 59 in which the phenolic curing resin is dimethylol-p-octyl phenol.

* * * * *